V. GIBSON.
POULTRY TRAP NEST.
APPLICATION FILED NOV. 12, 1915.
1,184,341.
Patented May 23, 1916.
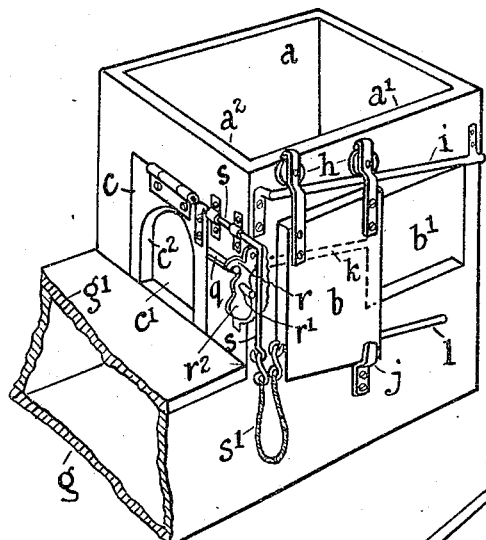
Fig. 1
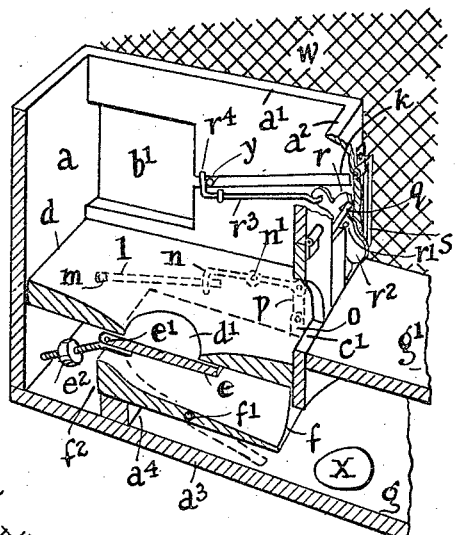
Fig. 2
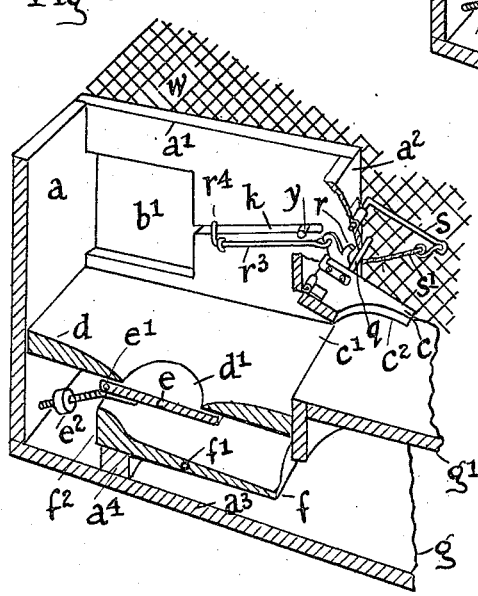
Fig. 3
Fig. 4
INVENTOR:
Victor Gibson
BY M. Wallace White
ATTY.

UNITED STATES PATENT OFFICE.

VICTOR GIBSON, OF HOLBROOK, NEW SOUTH WALES, AUSTRALIA.

POULTRY TRAP-NEST.

1,184,341. Specification of Letters Patent. Patented May 23, 1916.

Application filed November 12, 1915. Serial No. 61,051.

*To all whom it may concern:*

Be it known that I, VICTOR GIBSON, a subject of the King of Great Britain and Ireland, &c., residing at Holbrook, in the State of New South Wales, Commonwealth of Australia, have invented certain new and useful Improvements in Poultry Trap Nests; and I do hereby declare the following to be a full, clear, and exact description of the invention, such as will enable others skilled in the art to which it appertains to make and use the same.

My invention relates to trap nests to receive eggs laid by poultry or other birds. Known nests shut in the bird which enters, and she has in some cases to be released by an attendant;—in others she releases herself, but the attendant must reset the trap to allow another hen to enter. No attendant is required in regard to my nest. If the hen does not lay she must return by the way she entered. If she lays that entrance closes, and she must emerge through an exit which opens into a special inclosure. So the hens which have laid will become separated from those which have not. When an egg is laid it causes the entrance door to close and become locked, and causes the exit door to become unlocked. Then the hen pushes the exit door open, and the latter by means of a connection opens the entrance door. Then the exit door closes and becomes locked, and the cycle of operations ends.

The nest is made of any suitable materials, and may have a lid or other parts which can be opened to give access for cleaning or otherwise, and the nest plate on which the fowl sits can be removable, but these are all minor matters.

The drawings herewith are diagrammatic.

Figure 1 is a perspective view of part of the nest ready for a hen to enter, or in the position when one has entered but has not laid an egg. Fig. 2 shows the nest in vertical section with parts in the position taken after the egg has been laid, but before the hen leaves the nest. Fig. 3 shows, in vertical section, parts of the nest in the position taken when the hen after laying is leaving. Fig. 4 shows an elevation in vertical section of details of connections to the hook which at first holds the entrance door open, but in this view the hook is raised, and the open door will thus move into its closed position in the direction indicated by an arrow.

The lid is not shown, as it forms no part of the invention. Minor details may be varied while keeping within what I claim. Thus the relative sizes, designs, and numbers of some parts are not to be restricted to those shown. Various hooks and other movable parts which are used are, for example, weighted in any suitable manner, and adjustable or other springs may at will be used to assist in producing the described motions.

The nest is box like with an interior $a$, walls $a^1$, $a^2$, an entrance doorway $b^1$ in wall $a^1$, exit door $c$ and doorway $c^1$ in wall $a^2$, and a light-way or hole $c^2$ in, under, or next to the door $c$.

$w$ (shown in Figs. 2 and 3 only) represents part of a fence or partition provided between the areas intended for fowls which have not laid, and those which have, so that to pass from one side of this fence to the other fowls must go through the doorways $b^1$ and $c^1$.

$d$ is a nest plate which may for purposes of inspection, cleaning or so forth, be moved or lifted out at will, and which has any suitable means as supports $d^2$ (shown only in Fig. 4) to keep the said plate at a suitable height over the nest bottom $a^3$. The nest plate has a hole $d^1$ and I prefer that normally this hole shall be closed by a trap door $e$ which opens under the weight of an egg, allows the latter to fall on a chute $f$, and then closes automatically by reason of a preferably adjustable weight $e^2$—$e^1$ being a pivot or hinge. The egg $x$ rolls or slides down the chute to any suitable removable or fixed receptacle $g$. The chute has any suitable pivots as by having a spindle $f^1$ supported at its ends by the nest sides. One end $f^2$ of the chute on which the egg descends is supported at a suitable height as by any member $a^4$, and the other end is free to descend under the weight of an egg, as indicated in Fig. 4, and by dotted lines in Fig. 2.

The entrance door $b$ is shown hung on rollers or pulleys $h$, so that when not held in its open position, as in Fig. 2, it closes, the pulleys running down an inclined rail $i$. The door $b$ is kept closed when the nest is not set for use, and, after the door is set open, it closes itself as soon as a hen has laid an egg in the nest. There can be any suitable guide or guides as the lug $j$ to keep the door near the nest wall.

$k$ and $l$ are inclined slots in the wall $a^1$, and they allow respective projections from the door $b$ to have their heads located and movable inside the nest, where there is mechanism to act in conjunction with the said heads.

To hold the entrance door open to set the nest ready for use, it has a projection $m$ which is engaged by a hook $n$ which is pivoted as at $n^1$ to the nest wall $a^1$.

When the chute $f$ is descending under the weight of an egg it moves a connection as an arm $o$ attached to a link $p$ which is pivoted to the hook $n$, so that the hook becomes disengaged from the door projection $m$. The door $b$ then closes by gravity, and the bird finds itself trapped, unless it has learned of the exit, which in any case it easily finds. Door $c$ is kept locked until the egg is laid, by reason of a lug $q$ on that door being engaged by any suitable hook $r$ secured to the nest body. When the egg is laid the closing of the entrance $b^1$ causes the hook $r$ to be moved clear of lug $q$, thus unlocking the exit door $c$. The hook $r$ has a pivot $r^1$, a weighted limb $r^2$, and a lug connected to which is a link $r^3$ having an end $r^4$ which is in the path of and will be struck by a projection $y$ (passing through slot $k$) from the door $b$, when that door closes. This action of the projection causes the hook $r$ to move clear of the lug $q$. As the door $c$ only partly closes its doorway $c^1$ (that is as the hole $c^2$ admits considerable light to the nest) the hen attempts to escape through that hole, which however is too small to allow her to do so. But in her attempt the hen pushes the door $c$, and the latter yields, and allows the hen to escape over a floor $g^1$ which may be the top of the receiver $g$. As the door $c$ opens, a projection from it, as a bent arm $s$, having a connection $s^1$ to the entrance door $b$ will swing as shown in Fig. 3 so as to pull the door $b$ open, so that by the time the hen has escaped the door projection $m$ will have moved to and engaged the depressed hook $n$, which thus keeps the door open. When the fowl has escaped the exit door $c$ closes, as by its weight, and its lug $q$ engages the pivoted hook $r$, so that that door remains locked until the entrance door is next closed, which will be when another hen has entered and laid an egg.

Having described this invention, what is claimed by Letters Patent is:—

1. In a poultry trap nest having walls, a sliding entrance door, a hinged exit door, both said doors being adapted to be closed by gravity, a projection on the entrance door, a lock for the exit door, and means for releasing said lock adapted to be operated by engagement with said projection when the entrance door closes, whereby closure of the entrance door unlocks the exit door.

2. In a poultry trap nest, the combination of side and end walls, an entrance opening in one of said walls, an exit opening in another of said walls, a sliding entrance door adapted to be closed by gravity, a projection on said door passing through a slot in the corresponding wall, automatic means engaging said projection to maintain said door in open position until an egg is laid, means operated by the egg to release said projection to allow the entrance door to close, a second projection on the entrance door passing through a second slot in said wall, a lock for said exit door, lock releasing means adapted to be engaged by said second projection when the entrance door is closed to unlock the exit door, and means connecting the two doors whereby opening of the exit door by the hen during exit moves the entrance door to open position.

3. In a poultry trap nest the combination of side and end walls, a removable nest plate, a sliding gravity closing entrance door, a hinged gravity closing exit door having a light opening therein; a projection on said entrance door, a hook adapted to automatically engage said projection to hold said entrance door open, a chute adapted to receive and transfer the egg and adapted to be moved by the egg, said chute being operatively connected to said hook, whereby the said projection is released and the door closed upon the laying of an egg, a lock for said exit door, a lock releasing member connected with said lock, a second projection on the entrance door adapted to strike said lock releasing member when the entrance door is closed, thus unlocking the exit door, an arm connected to the exit door, and means connecting said arm with the entrance door whereby opening of the exit door by the departing hen moves the entrance door to open position.

In witness whereof I have hereunto set my hand.

VICTOR GIBSON.

Copies of this patent may be obtained for five cents each, by addressing the "Commissioner of Patents, Washington, D. C."